US011438416B1

(12) United States Patent
Kang et al.

(10) Patent No.: US 11,438,416 B1
(45) Date of Patent: Sep. 6, 2022

(54) SHARED STORAGE DYNAMIC USER QUOTA SYSTEM

(71) Applicant: Dell Products L.P., Round Rock, TX (US)

(72) Inventors: Jian Kang, Chengdu (CN); Mingyi Luo, Chengdu (CN); Hongyuan Zeng, Chengdu (CN); Ruiyang Zhang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/237,181

(22) Filed: Apr. 22, 2021

(30) Foreign Application Priority Data

Apr. 1, 2021 (CN) .......................... 202110358799.1

(51) Int. Cl.
*H04L 67/1097* (2022.01)
*G06N 20/00* (2019.01)
*G06F 3/06* (2006.01)

(52) U.S. Cl.
CPC ........ *H04L 67/1097* (2013.01); *G06F 3/0605* (2013.01); *G06F 3/067* (2013.01); *G06F 3/0653* (2013.01); *G06N 20/00* (2019.01)

(58) Field of Classification Search
None
See application file for complete search history.

(56) References Cited

U.S. PATENT DOCUMENTS

| 8,131,784 | B1* | 3/2012 | Zhuge | G06F 16/113 707/823 |
| 8,463,825 | B1* | 6/2013 | Harty | G06F 16/188 711/100 |
| 9,449,113 | B2* | 9/2016 | Hilerio | G06F 12/0866 |
| 10,152,268 | B1* | 12/2018 | Chakraborty | G06F 3/065 |
| 2010/0272413 | A1* | 10/2010 | Bhogal | H04N 21/44222 386/295 |
| 2015/0301903 | A1* | 10/2015 | Mutha | G06F 11/1446 707/692 |
| 2019/0173937 | A1* | 6/2019 | Kataria | H04L 67/04 |
| 2019/0311293 | A1* | 10/2019 | Bowers | G06F 3/067 |
| 2021/0216646 | A1* | 7/2021 | Miller | H04L 9/30 |

* cited by examiner

*Primary Examiner* — Jonathan A Bui
(74) *Attorney, Agent, or Firm* — Joseph Mencher

(57) ABSTRACT

A shared storage dynamic user quota system includes a storage management device coupled to a storage system having a shared storage space. The storage management device receives a data storage request from a user device to store data in the shared storage space. If the storage management device determines that the storage of the data in the shared storage space will exceed a user storage quota for a user associated with the user device, it determines whether the user qualifies to store the data in the shared storage space and exceed the user storage quota. In response to determining that the user qualifies to store the data in the shared storage space and exceed the user storage quota, the storage management device stored the data in the shared storage space.

20 Claims, 13 Drawing Sheets

SHARED STORAGE DYNAMIC USER QUOTA SYSTEM

CROSS-REFERENCE TO RELATED APPLICATIONS

This application claims priority to Chinese Patent Application Serial No. 202110358799.1, filed on Apr. 1, 2021, the disclosure of which is incorporated herein by reference in its entirety.

BACKGROUND

The present disclosure relates generally to information handling systems, and more particularly to providing dynamic user quotas in shared storage information handling systems.

The present disclosure relates generally to information handling systems, and more particularly to providing dynamic user quotas in shared storage information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, storage systems, may sometimes be shared by users to store data. In such shared storage systems, user storage quotas are often utilized to place a data storage limit on an amount of shared storage space in the shared storage system that may be utilized by any particular user to store their data, and allow a user to store data in the shared storage space up to that quota/data storage limit in order to prevent some users from using up all the shared storage space at the detriment of other users. However, conventional shared storage user quota systems suffer from a number of issues. For example, the shared storage space required by any particular user will often vary over time, with some users occasionally requiring more shared storage space than is allowed by their user storage quota (e.g., in order to complete an urgent task), and other users requiring less shared storage space than is allowed by their user storage quota. As such, the shared storage system may operate inefficiently, as it may have available shared storage space that will not be utilized when particular users require more shared storage space than is allowed by their user storage quota.

Furthermore, it may be relatively difficult for any particular user to estimate their shared storage space requirements, and thus the user storage quota selected for that user may be exceeded. In such situations, that user must then contact a shared storage system administrator and request that their user storage quota be increased, and that shared storage system administrator will then be required to manually increase the user storage quota for that user so that they are allowed to store additional data in the shared storage space. As will be appreciated by one of skill in the art in possession of the present disclosure, shared storage systems may be shared by hundreds, thousands, or even more users, and thus the exceeding of the user storage quotas discussed above will result in the storage system administrator being regularly notified of the exceeding of those user storage quotas (e.g., via email), and the resulting manual user storage quota adjustments discussed above will be time consuming and inefficient for the storage system administrator to perform.

Accordingly, it would be desirable to provide a shared storage user quota system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage management engine that is configured to: receive, from a user device, a data storage request to store data in a shared storage space; determine that the storage of the data in the shared storage space will exceed a user storage quota for a user associated with the user device; determine, in response to determining that the storage of the data in the shared storage space will exceed the user storage quota, that the user qualifies to store the data in the shared storage space and exceed the user storage quota; and store, in response to determining that the user qualifies to store the data in the shared storage space and exceed the user storage quota, the data in the shared storage space.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
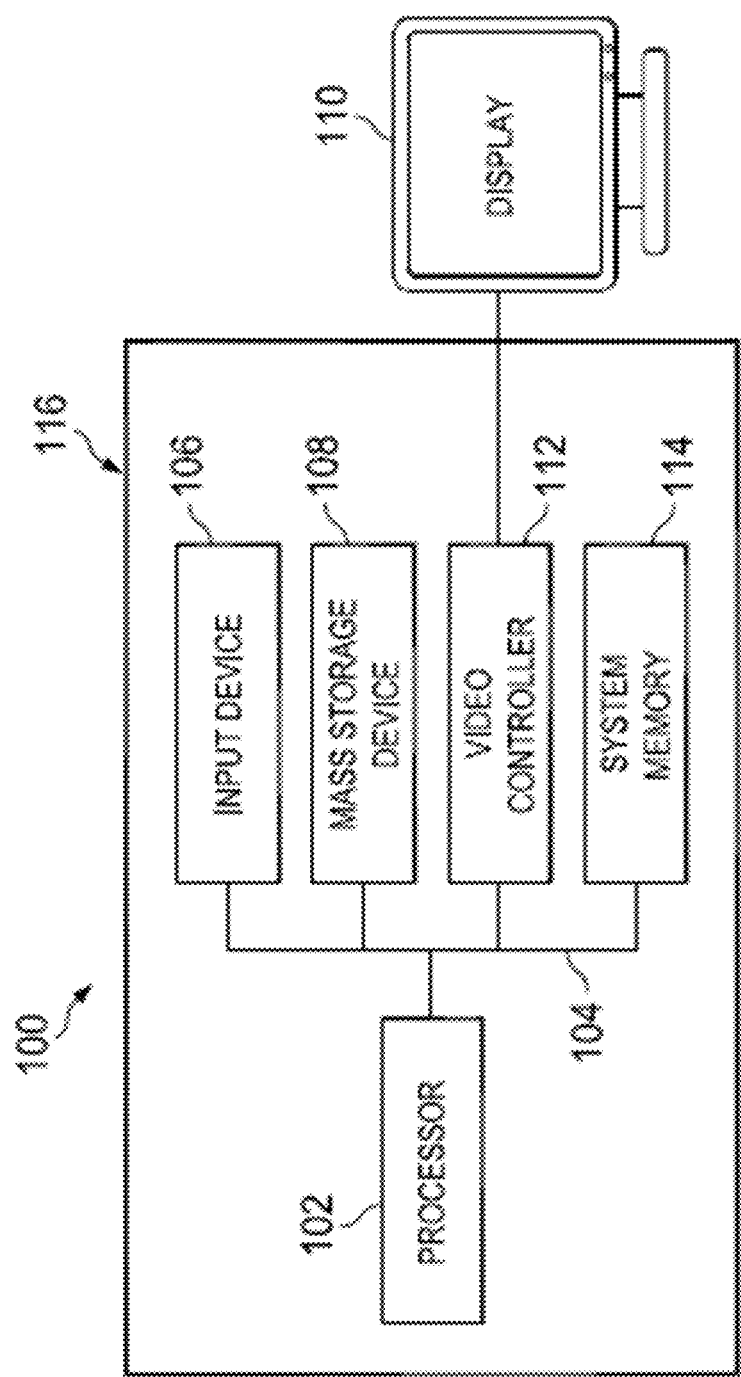
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
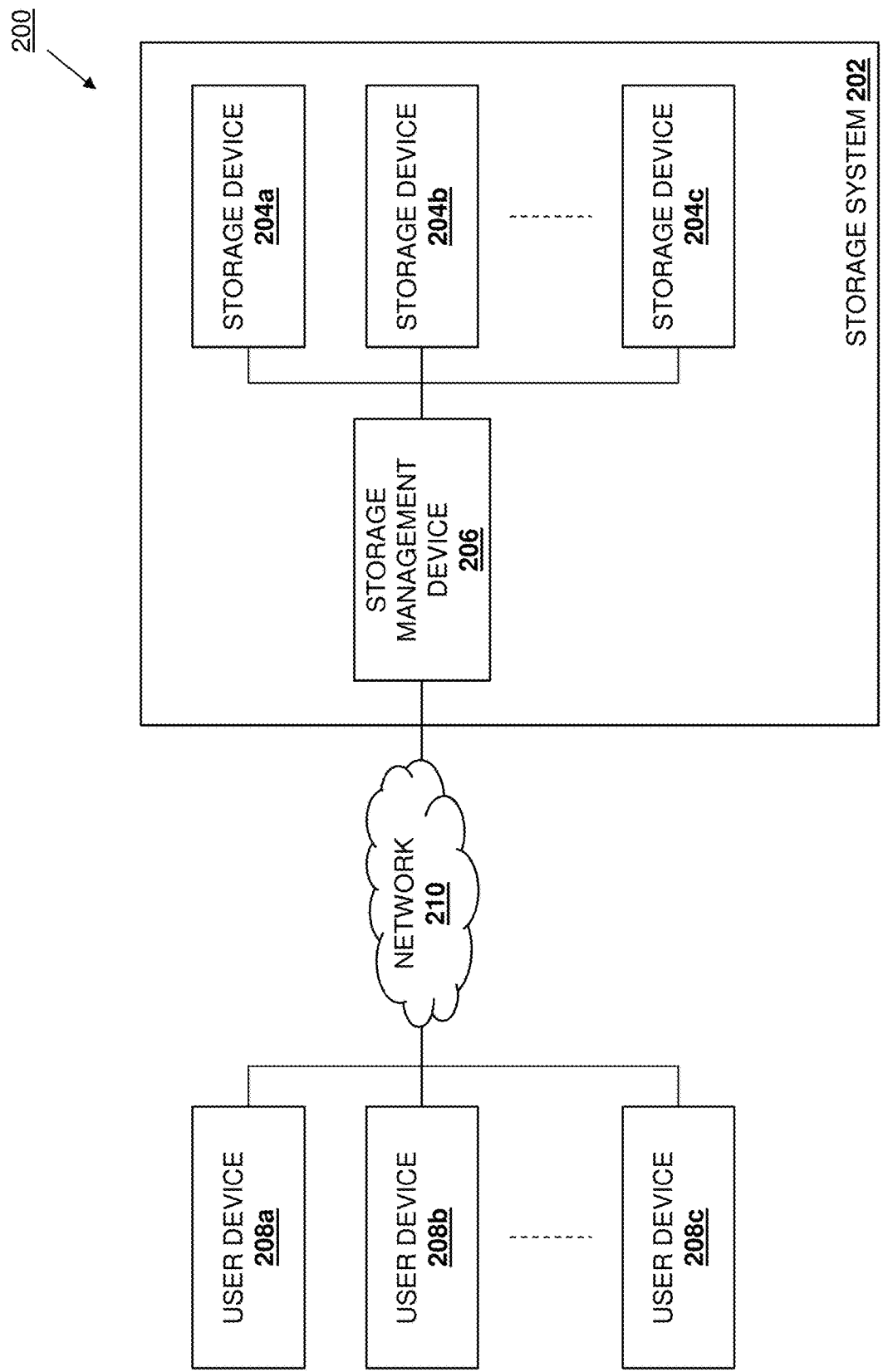
FIG. 2 is a schematic view illustrating an embodiment of a networked system that may utilize the shared storage dynamic user quota system of the present disclosure.

Referring now to FIG. 2, an embodiment of a networked system 200 is illustrated. In the illustrated embodiment, the networked system 200 includes a storage system 202. In an embodiment, the storage system 202 may be provided by the IHS 100 discussed above with reference to FIG. 1, and/or may include some or all of the components of the IHS 100, and in the specific examples below includes a plurality of storage devices 204a, 204b, and up to 204c. In a specific example, the storage devices 204a-204c may be provided by Hard Disk Drive (HDD) storage devices, Solid State Storage (SSD) storage devices, and/or any other storage devices that would be apparent to one of skill in the art in possession of the present disclosure. However, while illustrated and discussed as be provided by a storage system including specific storage devices, one of skill in the art in possession of the present disclosure will recognize that the shared storage space (discussed in further detail below) provided in the networked system 200 may be provided by a variety of types of devices (e.g., any Network Attached Storage (NAS)-capable storage device) that are configured to operate similarly as the storage system 202 discussed below, and may include any number (e.g., one or more) of storage devices while remaining within the scope of the present disclosure.

In the illustrated embodiment, the storage system 202 includes a storage management device 206. In an embodiment, the storage management device 206 may be provided by the IHS 100 discussed above with reference to FIG. 1, and/or may include some or all of the components of the IHS 100, and in the specific examples below may be provided by a storage processor, software utilized with a storage processor, or other component integrated in the storage system 202. However, while the storage management device 206 is illustrated and described below as being integrated or otherwise included in the storage system 202, one of skill in the art in possession of the present disclosure will recognize that the storage management device 206 may be separate from the storage system 202 while remaining within the scope of the present disclosure as well.

In the illustrated embodiment, the networked system 200 also includes a plurality of user devices 208a, 208b, and up to 208c. In an embodiment, any or all of the user devices 208a-208c may be provided by the IHS 100 discussed above with reference to FIG. 1, and/or may include some or all of the components of the IHS 100, and in specific examples may be provided by server computing devices, desktop computing systems, laptop/notebook computing systems, tablet computing devices, mobile phones, and/or any other computing devices that would be apparent to one of skill in the art in possession of the present disclosure. Furthermore, while only three user devices are illustrated and described in the examples below, one of skill in the art in possession of the present disclosure will appreciate that hundreds, thousands, or even more user devices may utilize the shared storage space provided by the storage system 202 while remaining within the scope of the present disclosure as well. As illustrated, each of the user devices 208a, 208b, and up to 208c are coupled to the storage system 202 via a network 210 that may be provided by a Local Area Network (LAN), the Internet, combinations thereof, and/or any other network that would be apparent to one of skill in the art in possession of the present disclosure. Furthermore, while a specific networked system 200 has been illustrated and described, one of skill in the art in possession of the present disclosure will recognize that the shared storage dynamic user quota system of the present disclosure may include a variety of components and component configurations while remaining within the scope of the present disclosure as well.

Figure 3:
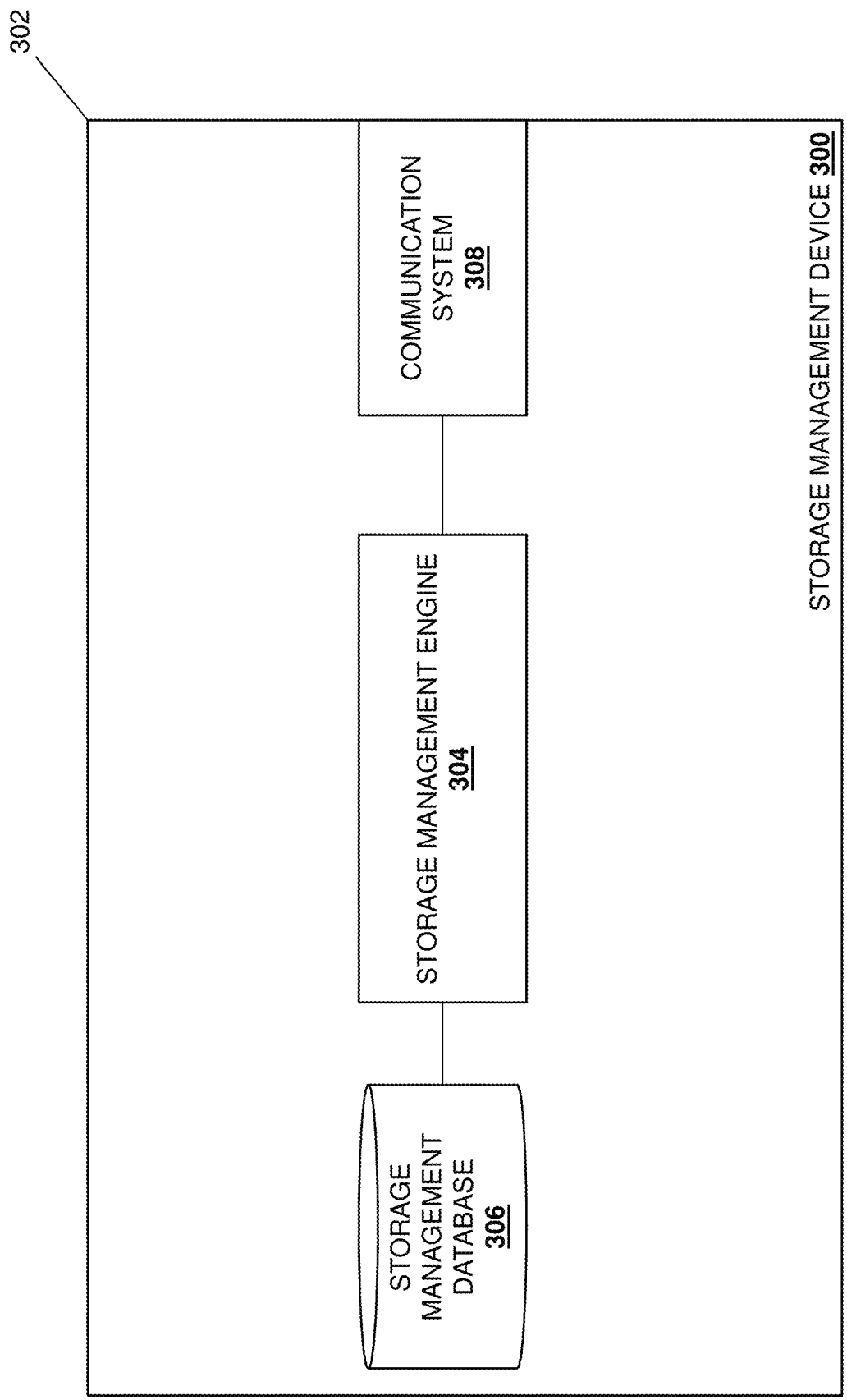
FIG. 3 is a schematic view illustrating an embodiment of a storage management device that may be included in the networked system of FIG. 2 and that may provide the shared storage dynamic user quota system of the present disclosure.

Referring now to FIG. 3, an embodiment of a storage management device 300 is illustrated that may provide the storage management device 206 discussed above with reference to FIG. 2. As such, the storage management device 300 may be provided by the IHS 100 discussed above with reference to FIG. 1 and/or may include some or all of the components of the IHS 100, and in the specific examples provided herein is an integrated component of a storage system. However, while illustrated and discussed as being provided by an integrated component in a storage system, one of skill in the art in possession of the present disclosure will recognize that the functionality of the storage management device 300 discussed below may be provided by storage management devices that are external to a storage system and that are configured to operate similarly as the storage management device 300 discussed below. In the illustrated embodiment, the storage management device 300 includes a chassis 302 that houses the components of the storage management device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage management engine 304 that is configured to perform the functionality of the storage management engines and/or storage management devices discussed below. In some of the embodiments discussed below, the storage management engine 304 may include a reinforcement learning sub-engine that is configured to utilize reinforcement learning techniques to determine whether to perform shared storage reclamation operations, discussed in further detail below, but one of skill in the art in possession of the present disclosure will appreciate that the shared storage reclamation operations may be performed based on other techniques while remaining within the scope of the present disclosure as well. Furthermore, in some specific examples described below, the reinforcement learning sub-engine may be provided by Deep Q-Network (DQN) reinforcement learning sub-engine, although one of skill in the art in possession of the present disclosure will appreciate that other reinforcement learning techniques will fall within the scope of the present disclosure as well.

The chassis 302 may also house a storage system (not illustrated, but which may include the storage 108 discussed above with reference to FIG. 1) that is coupled to the storage management engine 304 (e.g., via a coupling between the storage system and the processing system) and that includes a storage management database 306 that is configured to store any of the information utilized by the storage management engine 304 discussed below. The chassis 302 may also house a communication system 308 that is coupled to the storage management engine 304 (e.g., via a coupling between the communication system 308 and the processing system) and that may be provided by any of a variety of communication components that one of skill in the art in possession of the present disclosure would recognize as coupling the storage management engine 304 to the network 210 and the storage devices 204a-204c of FIG. 2. However, while a specific storage management device 300 has been illustrated, one of skill in the art in possession of the present disclosure will recognize that storage management devices (or other devices operating according to the teachings of the present disclosure in a manner similar to that described below for the storage management device 300) may include a variety of components and/or component configurations for providing conventional storage management device functionality, as well as the functionality discussed below, while remaining within the scope of the present disclosure as well.

Figure 4:
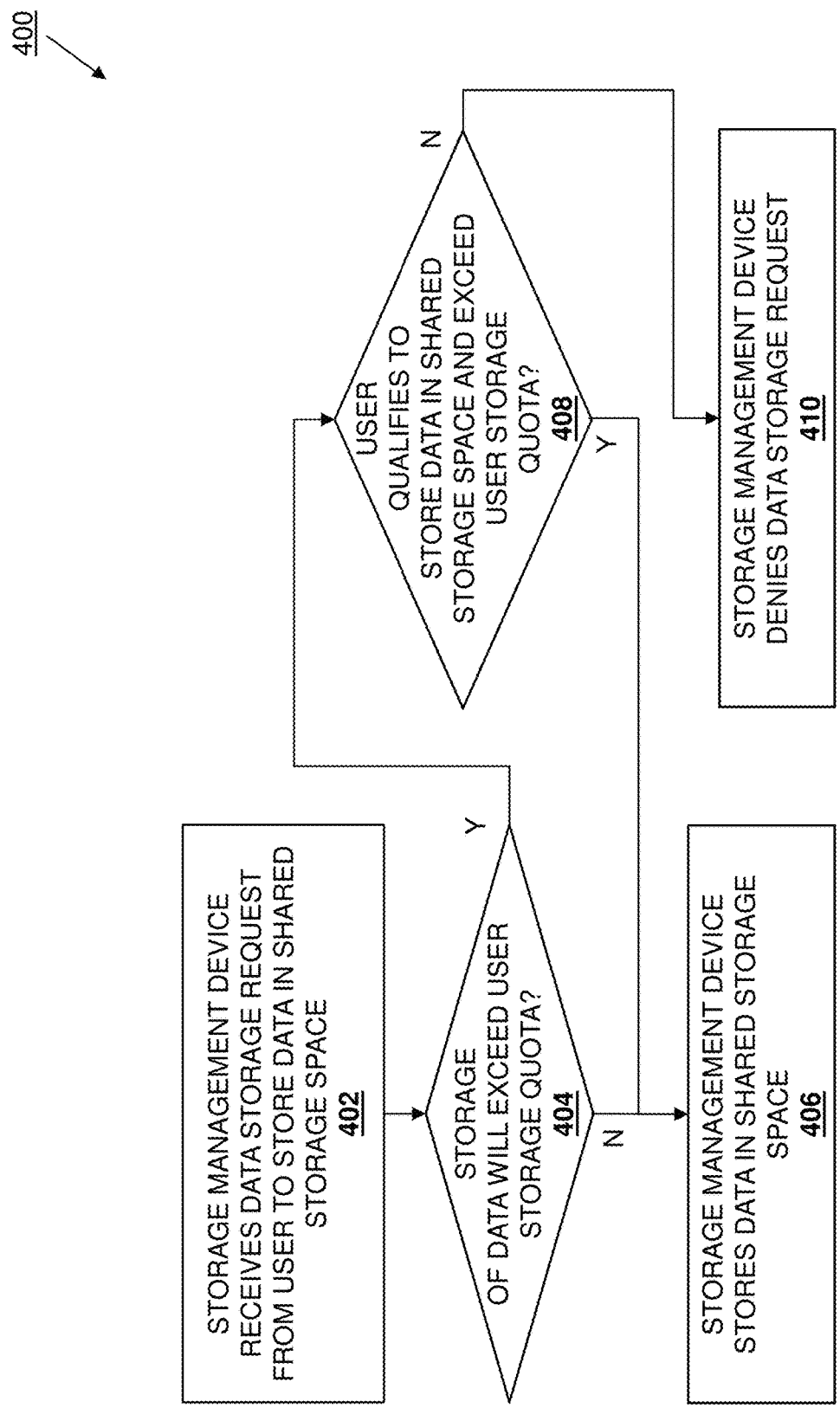
FIG. 4 is a flow chart illustrating an embodiment of a method for provided dynamic user quotas in a shared storage system.

Referring now to FIG. 4, an embodiment of a method 400 for provided dynamic user quotas in a shared storage system is illustrated. As discussed below, the systems and methods of the present disclosure provide for the storage of data in shared storage space provided by a shared storage system in a manner that provides automated and adaptive dynamic/elastic user storage quotas that allow some users to utilize more of the shared storage space than is strictly allowed per their user storage quota for limited time periods. For example, the shared storage dynamic user quota system of the present disclosure may include a storage management device coupled to a storage system having a shared storage space. The storage management device receives a data storage request from a user device to store data in the shared storage space. If the storage management device determines that the storage of the data in the shared storage space will exceed a user storage quota for a user associated with the user device, it determines whether the user qualifies to store the data in the shared storage space and exceed the user storage quota. In response to determining that the user qualifies to store the data in the shared storage space and exceed the user storage quota, the storage management device stored the data in the shared storage space. As such, users of the shared storage system with relatively short-term, high storage demands may exceed their user storage quotas without the need for manual intervention by a storage system administrator, which provides a more efficient utilization of the shared storage space, particularly when other users of the shared storage system are utilizing less of the shared storage space than is allowed per their user storage quota.

Figure 5:
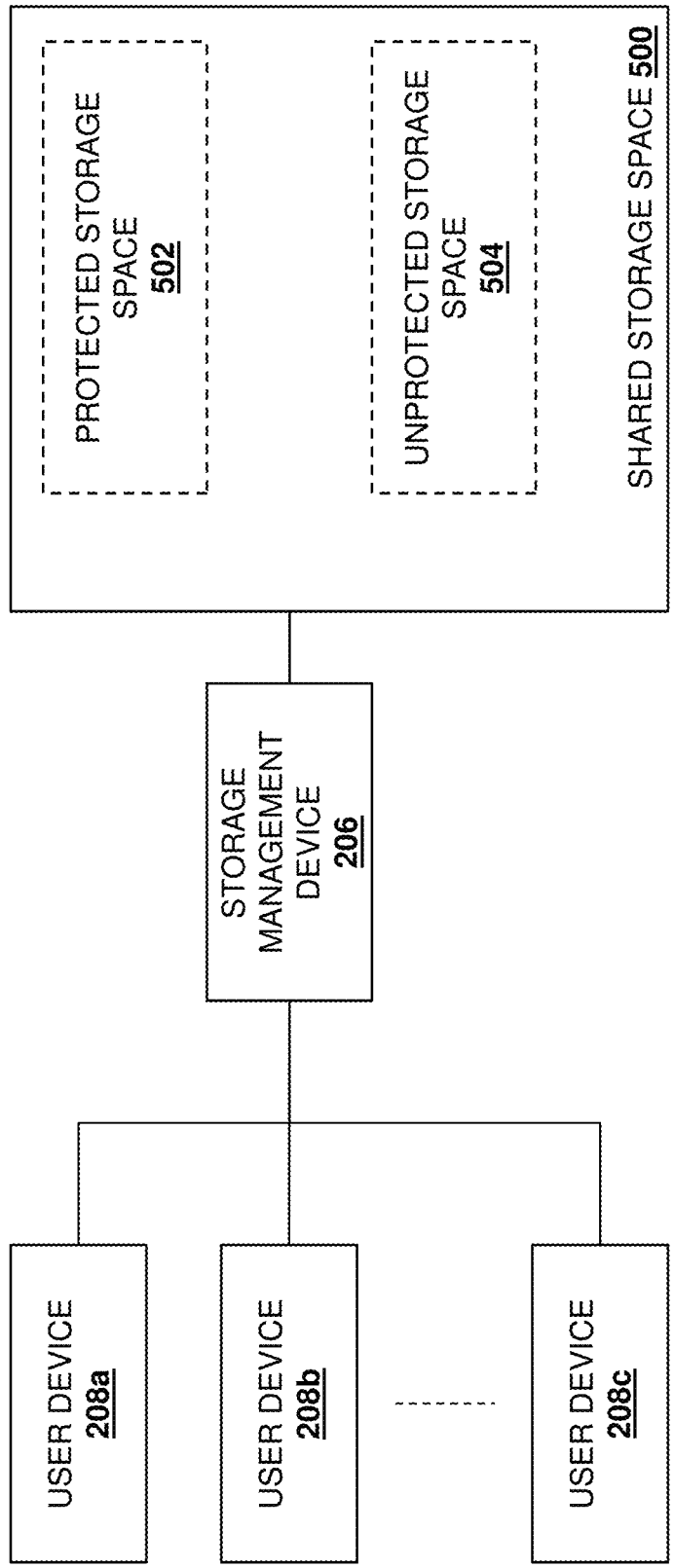
FIG. 5 is a schematic view illustrating an embodiment of the networked system of FIG. 2 operating during the method of FIG. 4.

With reference to FIG. 5, in some embodiments of the method 500, the storage devices 204a, 204b, and up to 204c may be configured to provide a shared storage space 500 that, as discussed below, may include a protected storage space 502 and an unprotected storage space 504. As described below, users of the user devices 208a, 208b, and up to 208c may utilize the shared storage space 500 to store data (e.g., through the network 210 (not illustrated in FIG. 5) and via the storage management device 206), and may each be associated with a respective user storage quota that defines an amount of the shared storage space 500 that user is guaranteed to be allowed to utilize. As such, in a simplified specific example, the shared storage space may be 1 TB, and each of five users may be associated with 200 GB user storage quotas, although one of skill in the art in possession of the present disclosure will appreciate that any of a variety of other size shared storage spaces and user storage quotas will fall within the scope of the present disclosure as well.

In some embodiments, the storage management device 206 may be configured to prevent any user of the user devices 208a-208c from storing data in the protected storage space 502 included in the shared storage space 500 in excess of their user storage quota, but may allow users of the user devices 208a-208c to store data in the unprotected storage space 504 included in the shared storage space 500 in excess of their user storage quota as long as the shared storage space 500 has unused storage space. As described in more detail below with reference to the method 900, data stored in the protected storage space 502 included in the shared storage space 500 may only be deleted by the user that stored that data, while data stored in the unprotected storage space 504 included in the shared storage space 500 in excess of the user storage quota associated with a corresponding user may be automatically deleted by the storage management device 206, and users may define a retention time period for any data stored in the unprotected storage space 504 included in the shared storage space 500 during which that data cannot be deleted from the unprotected storage space 504 included in the shared storage space 500. As such, users may be encouraged to store relatively important data in the protected storage space 502 included in the shared storage space 500 in order to ensure that such important data will not be automatically deleted.

Figure 6:
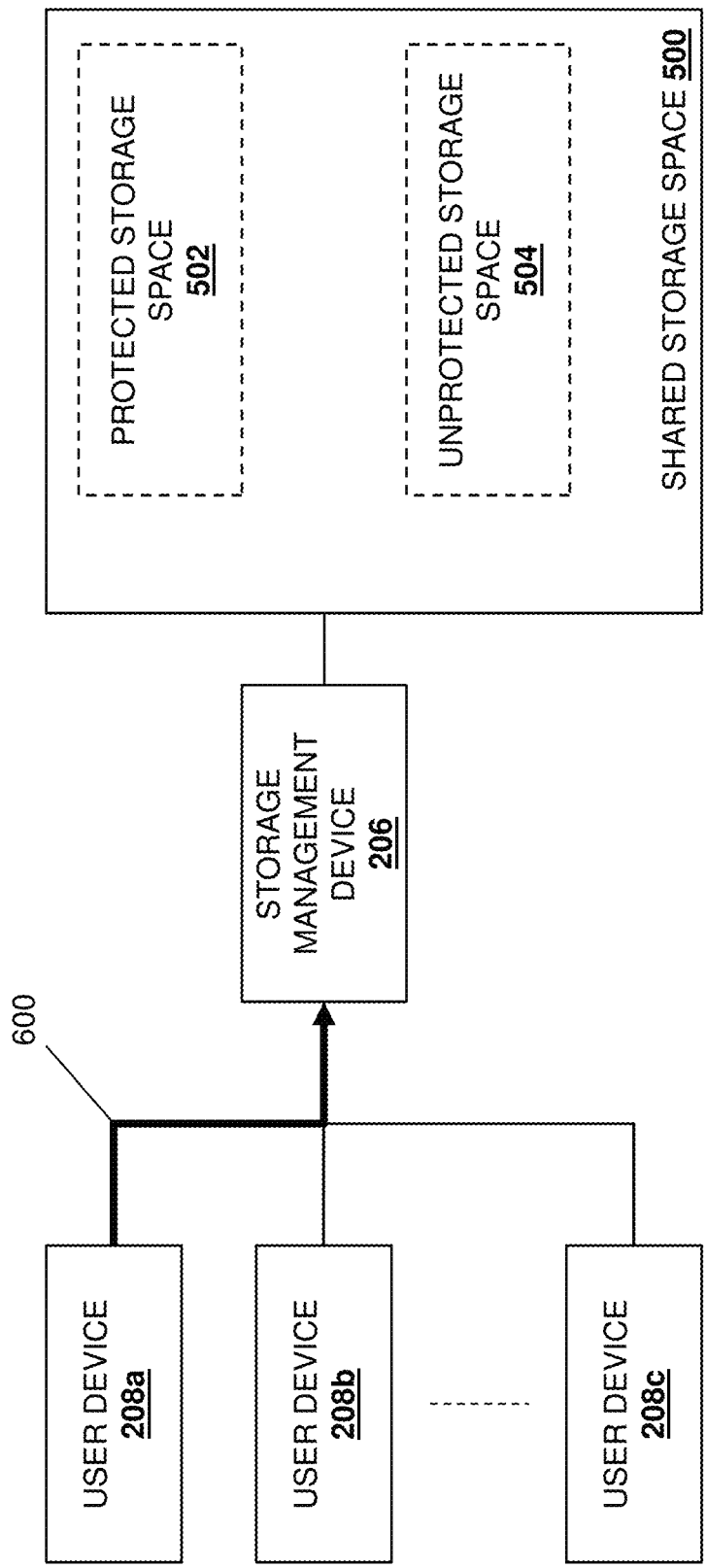
FIG. 6 is a schematic view illustrating an embodiment of the networked system of FIG. 5 operating during the method of FIG. 4.

The method 400 begins at block 402 where a storage management device receives a data storage request from a user to store data in a shared storage space. While the method 400 is described below for a single user of the user device 208a, one of skill in the art in possession of the present disclosure will appreciate that the method 400 may be performed to store data for each user of the user devices 208b and up to 208c while remaining within the scope of the present disclosure as well. With reference to FIG. 6, in an embodiment of block 402, the user device 208a may perform data storage request transmission operations 600 that include transmitting a data storage request associated with a user of the user device 208a to the storage management device 206 (e.g., via the network 210, not illustrated in FIG. 6). As discussed above, in some embodiments a user creating a data storage request to store data in the shared storage space 500 may designate the data for storage in the protected storage space 502 included in the shared storage space 500, or the unprotected storage space 504 included in the shared storage space 500. In an embodiment, data designated for storage in the unprotected storage space 504 included in the shared storage space 500 may be associated with a default retention time period (during which that data may not be automatically deleted, as discussed with regard to the method 900 below), or may have a retention time period specified by the user storing that data.

In many of the examples below, the data provided for storage as part of the data storage request is included in a file, but one of skill in the art in possession of the present disclosure will appreciate that data may be provided for storage in the shared storage space in a variety of data structures that will fall within the scope of the present disclosure as well. Furthermore, the data provided as part of the data storage request at block 402 may provide a new data file (e.g., a data file that was not previously stored in the shared storage space 500), an addition and/or modification to an existing data file (e.g., a data file that was previously stored in the shared storage space 500), and/or in a variety of other manners that would be apparent to one of skill in the art in possession of the present disclosure. As such, one of skill in the art in possession of the present disclosure will appreciate how the data storage request transmitted as part of the data storage request transmission operations 600 at block 402 may include the data that is being provided for storage in the shared storage space, an identifier for the user associated with the user device 208a (e.g., that is linked with the user storage quota for that user), a storage space designation (e.g., a designation of the protected storage space 502 or the unprotected storage space 504 as discussed above), a retention time period (e.g., for data designated for storage in the unprotected storage space 504), and/or any other data storage request information that would be apparent to one of skill in the art in possession of the present disclosure and allowing for the functionality discussed below. As such, at block 402, the storage management engine 304 in the storage management device 206/300 may receive the data storage request via its communication system 308.

The method 400 then proceeds to decision block 404 where it is determined whether storage of the data will exceed a user storage quota. In some embodiments of decision block 404 in which the data storage request received at block 402 designates the data for storage in the protected data space 502 included in the shared storage space 500, the storage management engine 304 in the storage management device 206/300 may determine whether the storage of that data in the protected data space 502 included in the shared storage space 500 will cause the user identified in the data storage request to exceed their user storage quota based on the following inequality A:

$$S_{u_i,PDS}[\Delta S] < Q_{u_i}$$

where $S_{u_i,PDS}[n]$ is the size of a user $u_i$'s data in the protected data space 502 at time n, $\Delta S$ is the size of the data that is provided in the data storage request, and $Q_{u_i}$ is the user storage quota for user $u_i$. As discussed below, in the event the inequality A above is satisfied and the storage of the data in the protected data space 502 included in the shared storage space 500 (i.e., $S_{u_i,PDS}[n]+\Delta S$) will cause the user identified in the data storage request to exceed their user storage quota ($Q_{u_i}$), the storage management engine 304 in the storage management device 206/300 will deny the data storage request (at block 410). Thus, users will not be allowed to store data in the protected data space 502 in excess of their user storage quota.

In the event inequality A above is satisfied and the storage of the data in the protected data space 502 included in the shared storage space 500 (i.e., $S_{u_i,PDS}[n]+\Delta S$) will cause the user identified in the data storage request to exceed their user storage quota ($Q_{u_i}$), the storage management engine 304 in the storage management device 206/300 may determine whether the storage of that data in the unprotected data space 504 included in the shared storage space 500 will cause the user identified in the data storage request to exceed their user storage quota based on the following inequality B:

$$S_{u_i,PDS}[n]+S_{u_i,UDS}[n]+\Delta S > Q_{u_i}$$

where $S_{u_i,PDS}[n]$ is the size of a user $u_i$'s data in the protected data space 502 at time n, $S_{u_i,UDS}[n]$ is the size of a user $u_i$'s data in the unprotected data space 504 at time n, $\Delta S$ is the size of the data that is provided in the data storage request, and $Q_{u_i}$ is the user storage quota for user $u_i$. As discussed below, in the event the inequality B above is satisfied and the storage of the data in the unprotected data space 502 included in the shared storage space 500 (i.e., $S_{u_i,UDS}[n]+\Delta S$) will cause the user identified in the data storage request to exceed their user storage quota ($Q_{u_i}$), the storage management engine 304 in the storage management device 206/300 will determine that the storage of the data will exceed a user storage quota at decision block 404.

In other embodiments of decision block 404 in which the data storage request received at block 420 designates the data for storage in the unprotected data space 504 included in the shared storage space 500, the storage management engine 304 in the storage management device 206/300 may determine whether the storage of that data in the unprotected data space 504 included in the shared storage space 500 will cause the user identified in the data storage request to exceed their user storage quota based on the inequality B discussed above.

Figure 7:
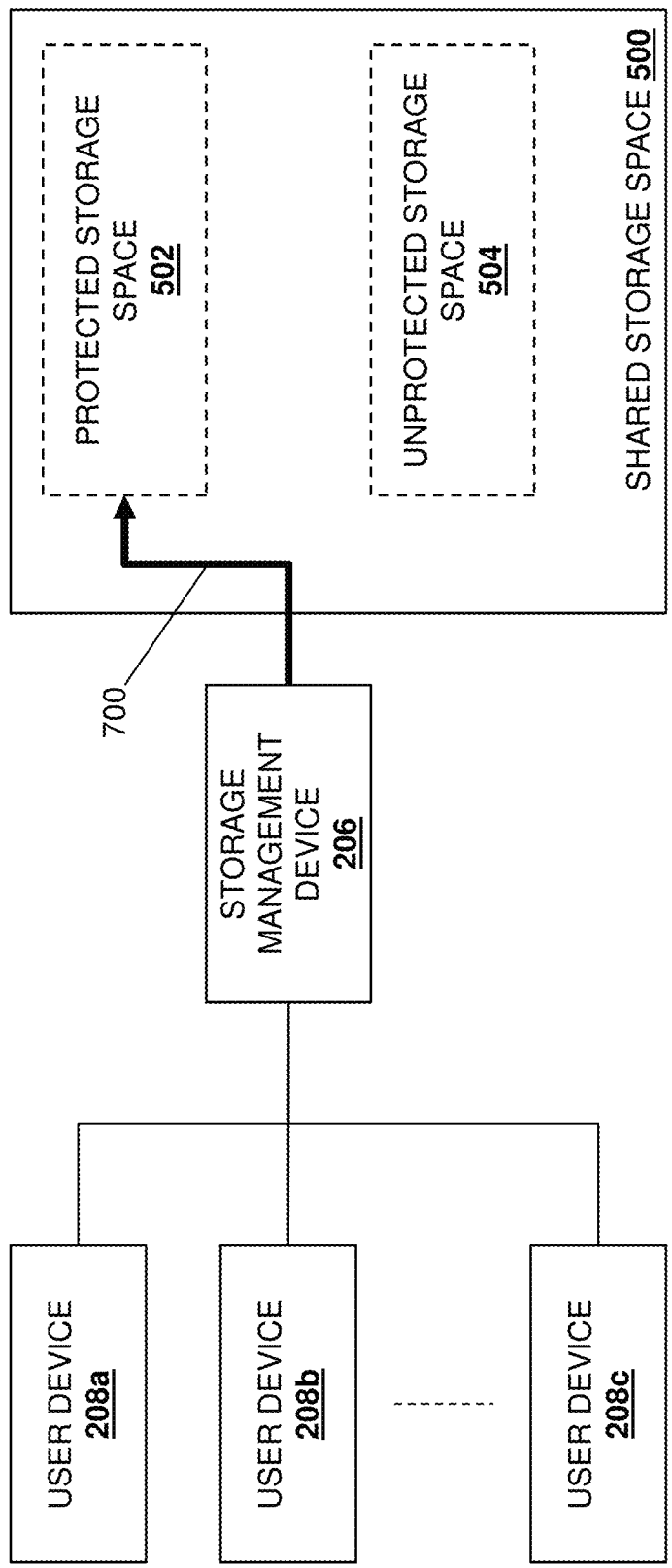
FIG. 7 is a schematic view illustrating an embodiment of the networked system of FIG. 5 operating during the method of FIG. 4.

If, at decision block 404, it is determined that the storage of the data will not exceed the user storage quota, the method 400 proceeds to block 406 where the storage management device stores the data in the shared storage space. In an embodiment, at block 406, the storage management engine 304 in the storage management device 206/300 may store the data included in the data storage request received at block 402. For example, with reference to FIG. 7 and in embodiments in which the data was designated for storage in the protected storage space 502 included in the shared storage space 500 and the storage of that data in the protected storage space 502 was determined to not exceed the user storage quota for the user according to inequality A, at block 406 the storage management engine 304 in the storage management device 206/300 may perform data storage operations 700 that include storing that data in the protected storage space 502 included in the shared storage space 500 in response to determining that the inequality A above is not satisfied.

Figure 8:
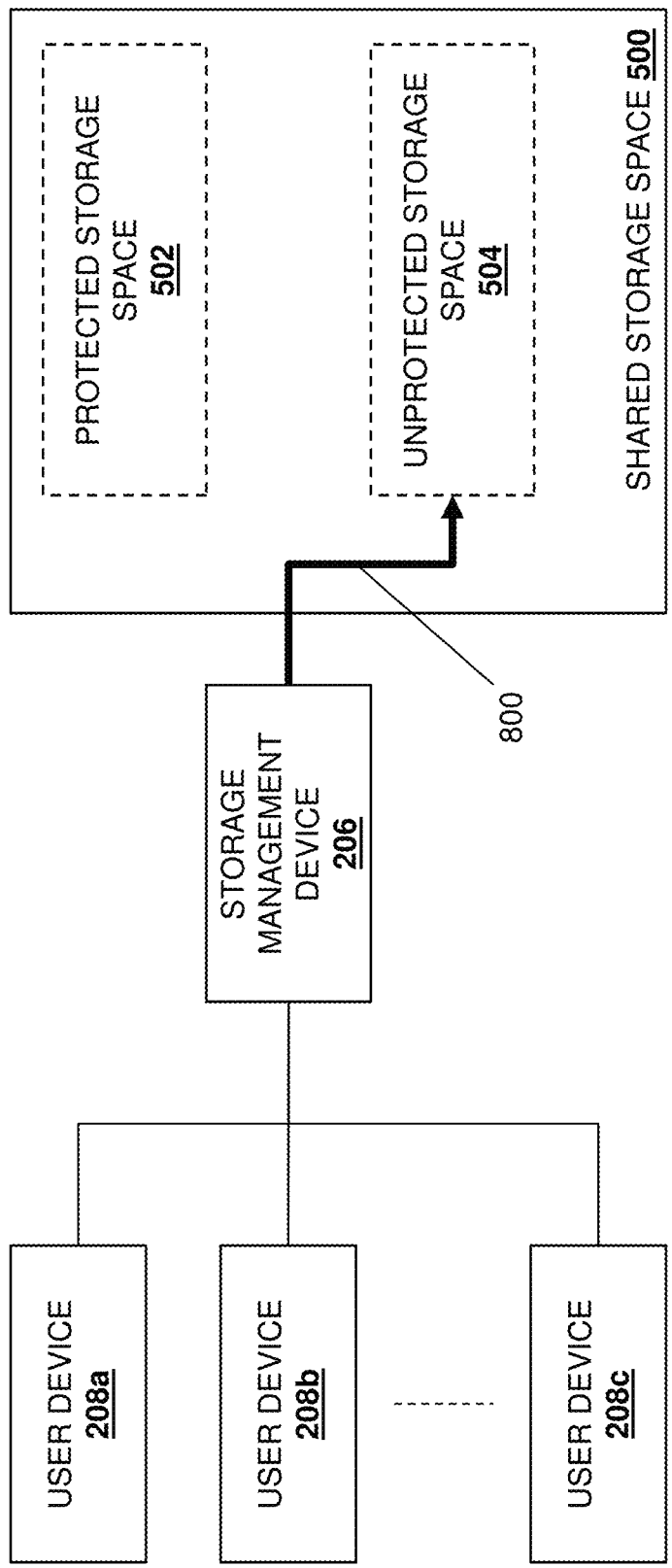
FIG. 8 is a schematic view illustrating an embodiment of the networked system of FIG. 5 operating during the method of FIG. 4.

In another example, with reference to FIG. 8 and in embodiments in which the data was designated for storage in the protected storage space 502 included in the shared storage space 500 and the storage of that data in the protected storage space 502 was determined to exceed the user storage quota for the user according to inequality A but was determined to not exceed the user storage quota for the user according to the inequality B, at block 406 the storage management engine 304 in the storage management device 206/300 may perform data storage operations 800 that include storing that data in the unprotected storage space 504 included in the shared storage space 500 in response to determining that the inequality B above is not satisfied. In yet another example, with reference again to FIG. 8 and in embodiments in which the data was designated for storage in the unprotected storage space 504 included in the shared storage space 500 and the storage of that data in the unprotected storage space 504 was determined to not exceed the user storage quota for the user according to the inequality B, at block 406 the storage management engine 304 in the storage management device 206/300 may perform the data storage operations 800 that include storing that data in the unprotected storage space 504 included in the shared storage space 500 in response to determining that the inequality B above is not satisfied.

If, at decision block 404, it is determined that the storage of the data will exceed the user storage quota, the method 400 proceeds to decision block 408 where it is determined whether the user qualifies to store data in the shared storage space and exceed their user storage quota. As discussed above, with respect to data that is designated for storage in the protected storage space 502 included in the shared storage space 500, the method 400 may proceed to decision block 408 in response to determining that the inequality A above is satisfied and the inequality B above is satisfied. As also discussed above, with respect to data that is designated for storage in the unprotected storage space 504 included in the shared storage space 500, the method 400 may proceed to decision block 408 in response to determining that the inequality B above is satisfied.

In an embodiment at decision block 408, the storage management engine 304 in the storage management device 206/300 may determine how much temporary storage space ($S_{temp}$) in the shared storage space is required to store the data for the user in excess of their user quota according to the following equation C:

$$S_{temp} = \min\{\Delta S, S_{u_i,PDS}[n] + S_{u_i,UDS}[n] + \Delta S - Q_{u_i}\}$$

where $\Delta S$ is the size of the data that is provided in the data storage request, $S_{u_i,PDS}[n]$ is the size of a user $u_i$'s data in the protected data space 502 at time n, $S_{u_i,UDS}[n]$ is the size of a user $u_i$'s data in the unprotected data space 504 at time n, and $Q_{u_i}$ is the user storage quota for user $u_i$. As will be appreciated by one of skill in the art in possession of the present disclosure, the function min provides a value for $S_{temp}$ that is the smaller of 1) the size of the data $\Delta S$, and 2) the difference between the user storage quota $Q_{u_i}$ and the amount of data that will be stored for the user if the data in the data storage request is stored in the shared storage space 500.

In response to determining the temporary storage space ($S_{temp}$) in the shared storage space required to store the data for the user in excess of their user quota, the storage management engine 304 in the storage management device 206/300 may determine whether that temporary storage space ($S_{temp}$) is less or equal to a maximum user-quota-exceeding data storage threshold for the user based on the following inequality D:

$$S_{temp} \leq \frac{Q_{ui}}{\sum_j Q_{uj}} \cdot (S_{ds,total} - S_{ds,used}[n])$$

wherein $Q_{ui}/\Sigma_j Q_{uj}$ is the ratio of the user associated with the data storage request to all of the other users of the shared storage space 500, $S_{ds,total}$ is the total storage capacity of the shared storage space 500, and $S_{ds,used}[n]$ is the amount of the storage capacity of the shared storage space 500 being used at time n. As such, in this example, the maximum user-quota-exceeding data storage threshold for a user allows that user to utilize temporary storage space ($S_{temp}$) that is less than or equal to the proportional share for that user (e.g., provided by the ratio of that user to all of the other users) of the currently remaining free/unused storage capacity of the shared storage space 500.

If, at decision block 408, it is determined that the user qualifies to store data in the shared storage space and exceed their user storage quota, the method 400 proceeds to block 406 where the storage management device stores the data in the shared storage space. Similarly as discussed above, at block 406, the storage management engine 304 in the storage management device 206/300 may store the data included in the data storage request received at block 402, but may do so as illustrated in FIG. 8 to store that data in the unprotected storage space 504 included in the shared storage space 500. As such, a user may be allowed to store data in excess of their user storage quota, but that data will be stored in the unprotected storage space 504 included in the shared storage space 500, and thus will be subject to automatic deletion during the method 900, discussed in further detail below.

If, at decision block 408, it is determined that the user does not qualify to store data in the shared storage space and exceed their user storage quota, the method 400 proceeds to block 410 where the storage management device denies the data storage request. In an embodiment, at block 410 and in response to determining that the user does not qualify to store data in the shared storage space 500, the storage management engine 304 in the storage management device 206/300 will deny the data storage request by, for example, generating and transmitting a data storage request denial notification to the user device 208a that is configured to provide that data storage request denial notification for display to the user (e.g., on a display device included in the user device 208a). As such, in response to determining that the temporary storage space ($S_{temp}$) in the shared storage space required to store the data for the user in excess of their user quota is greater than the maximum user-quota-exceeding data storage threshold for the user (e.g., greater than the proportional share for that user (e.g., provided by the ratio of that user to all of the other users) of the currently remaining free/unused storage capacity of the shared storage space 500), the data storage request received at block 402 will be denied.

Furthermore, as discussed above, in the event the inequality A above is satisfied and the storage of the data in the protected data space 502 included in the shared storage space 500 (i.e., $S_{ui,PDS}[n]+\Delta S$) will cause the user identified in the data storage request to exceed their user storage quota ($Q_{ui}$), the storage management engine 304 in the storage management device 206/300 will determine at decision block 404 that the storage of data will exceed the user storage quota at decision block 404, determine that the user may not store data in the protected storage space included in the shared storage space in excess of their user storage quota at decision block 408, and deny the data storage request at block 410. Thus, users will not be allowed to store data in the protected data space 502 in excess of their user storage quota.

Thus, when the shared storage space 500 includes free/unused storage capacity, users may be allowed to store data in the shared storage space 500 in excess of their user storage quotas as along as the amount of storage space needed to store that data does not exceed the proportional share for that user (e.g., provided by the ratio of that user to all of the other users) of the free/unused storage capacity of the shared storage space 500. As will be appreciated by one of skill in the art in possession of the present disclosure, the maximum user-quota-exceeding data storage threshold for users storing data in excess of their user storage quotas prevents those users from using up more than their "fair share" of the free/unused storage capacity in the shared storage space 500, and may be adjusted depending on a variety of considerations (e.g., Service Level Agreements (SLAs), etc.) known in the art.

Figure 9:
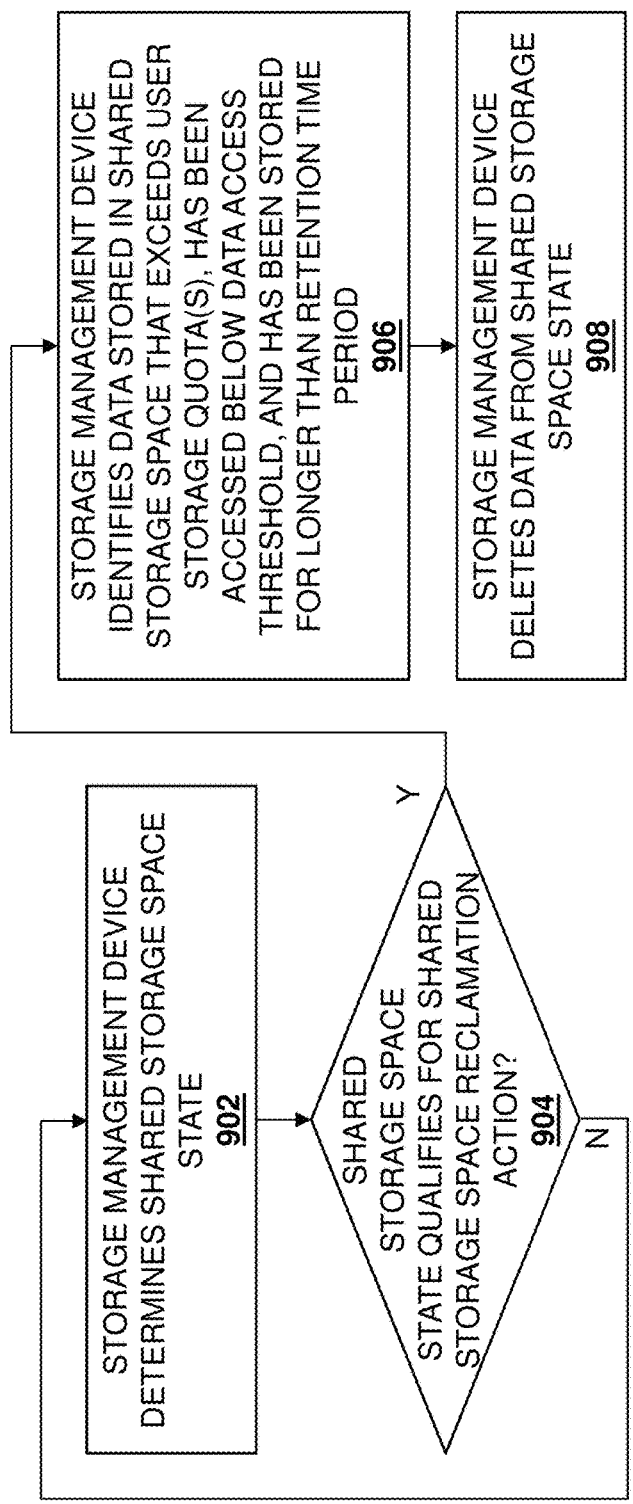
FIG. 9 is a flow chart illustrating an embodiment of a method for provided dynamic user quotas in a shared storage system.

Referring now to FIG. 9, an embodiment of a method 900 for provided dynamic user quotas in a shared storage system is illustrated. As discussed below, the systems and methods of the present disclosure may utilize reinforcement learning techniques to provide for the automated and adaptive reclamation of shared storage space that has been utilized to provide dynamic/elastic user storage quotas and allow some users to utilize more of the shared storage space than is strictly allowed per their user storage quota. For example, the shared storage dynamic user quota system of the present disclosure may include a storage management device coupled to a storage system having a shared storage space. The storage management device determines that a shared storage space state of the shared storage space qualifies for a shared storage space reclamation action, and performs the shared storage space reclamation action that includes determining that data that is stored in the shared storage space and that exceeds a user storage quota has been accessed below a data access threshold and has been stored in the shared storage space for longer than a retention time period and, in response, deleting the data from the shared storage space. As such, users of the shared storage system may exceed their user storage quotas for limited periods of time, after which the data stored in excess of those user storage quotas will be deleted from the shared storage system.

The method 900 begins at block 902 where a storage management device determines a shared storage space state. In an embodiment, at block 902, the storage management engine 304 in the storage management device 206/300 may monitor the shared storage space to identify a shared storage space state that includes an amount of the shared storage space being utilized, as well as any other storage space information that one of skill in the art in possession of the present disclosure will recognize as allowing for the functionality discussed below. Furthermore, in some embodiments, the shared storage space state monitoring may be performed over equal time intervals such that the amount of the shared storage space utilized over time is identified.

The method 900 then proceeds to decision block 904 where it is determined whether the shared storage space state qualifies for a shared storage space reclamation action. In an embodiment, the storage management engine 304 in the storage management device 206/300 may include a reinforcement learning sub-engine that is configured to utilize reinforcement learning techniques to determine an action to perform based on the shared storage space state identified at block 902. As will be appreciated by one of skill in the art in possession of the present disclosure, reinforcement learning techniques provide for the returning of a reward r[n] to the reinforcement learning sub-engine in the storage management engine 304 when an action a[n] is performed in response to the shared storage space state s[n], following which the shared storage space 500 enters a subsequent shared storage space state s[n+1].

For example, a state vector s[n] utilized by the reinforcement learning sub-engine in the storage management engine 304 may be provided by:

$$s[n]=(v[n]a[n]\mu[n])$$

In the state vector s[n] above, v[n] provides an instant "velocity" of the change in used space for the shared storage space 500 and may be determined by the following equation:

$$v[n] = \frac{S_{ds,used}[n] - S_{ds,used}[n-1]}{S_{ds,total}} * 100,$$

In the state vector s[n] above, a[n] provides an instant "acceleration" of the change in used space for the shared storage space 500 and may be determined by the following equation:

$$a[n] = \frac{(S_{ds,used}[n] - S_{ds,used}[n-1]) - (S_{ds,used}[n-1] - S_{ds,used}[n-2])}{S_{ds,total}} * 100,$$

In the state vector s[n] above, $\mu[n]$ provides a space utilization of the shared storage space 500 at a time n and may be determined by the following equation:

$$\mu[n] = \frac{S_{ds,used}[n]}{S_{ds,total} * 100}$$

Furthermore, the actions a[n] that may be performed by the reinforcement learning sub-engine in the storage management engine 304 in response to the shared storage space state s[n] may include 1) reclaiming storage capacity in the shared storage space 500, or 2) doing nothing with regard to the shared storage space 500, and the reward r[n] returned to the reinforcement learning sub-engine in the storage management engine 304 for performing such actions a[n] may be determined by the following equation:

$$r[n] = \left(\frac{S_{fs,used}[n]}{S_{fs,total}} - 0.5\right) * \text{sign}[n]$$

where $$\text{sign}[n] = \begin{cases} 1, & \text{if } a[n] \text{ is "reclaim storage capacity"} \\ -1, & \text{if } a[n] \text{ is "do nothing"} \end{cases}$$

As will be appreciated by one of skill in the art in possession of the present disclosure, at any point in time n, the reinforcement learning sub-engine in the storage management engine 304 may determine the space utilization μ[n] of the shared storage space 500, the instant "velocity" v[n] of the change in used space for the shared storage space 500, and the instant "acceleration" a[n] of the change in used space for the shared storage space 500, which allows the reinforcement learning sub-engine in the storage management engine 304 to determine the state vector s[n]/shared storage space state of the shared storage space 500 at that time n. Using that state vector s[n]/shared storage space state of the shared storage space 500 at the time n, along with the previous reward r[n−1], the reinforcement learning sub-engine in the storage management engine 304 may determine which action a[n] to perform ("reclaim storage capacity" or "do nothing" in this example), and in response will receive a reward r[n].

The process may then repeat to determine the state vector s[n+1]/shared storage space state of the shared storage space 500 at the time n+1, use that along with the reward r[n] to determine which action a[n+1] to perform, and in response receive a reward r[n+1]. Furthermore, one of skill in the art in possession of the present disclosure will appreciate that the equations for the reward r[n] and sign[n] cause the shared storage space reclamation action (e.g., reclaim storage capacity) to be selected relatively more often when the share storage space stores relatively more data, and to be selected relatively less often (e.g., the "do nothing" action is selected instead) when the share storage space stores relatively less data. In a specific example and as discussed in further detail below, the reinforcement learning sub-engine in the storage management engine 304 may utilize an ϵ-greedy action selection method in its selection of actions a[n] in order to provide for the exploration of new opportunities rather than always selecting the "best" action a[n] determined by a local reinforcement learning agent sub-engine.

As such, in an embodiment of decision block 904, the reinforcement learning sub-engine in the storage management engine 304 in the storage management device 206/300 may utilize the reinforcement learning techniques discussed above to determine whether the shared storage space state of the shared storage space 500 determined at block 902 qualifies for the shared space reclamation action (e.g., the reclaim storage capacity action discussed above). However, while specific reinforcement learning techniques have been described in the determination of whether the shared storage space state of the shared storage space 500 qualifies for the shared space reclamation action, one of skill in the art in possession of the present disclosure will recognize that other techniques for determining whether the shared storage space 500 qualifies for the shared space reclamation action will fall within the scope of the present disclosure as well.

If, at decision block 904, it is determined that the shared storage space state does not qualify for a shared storage space reclamation action, the method 900 returns to block 902. Thus, in response to determining that the shared storage space 500 does not qualify for the shared space reclamation action at decision block 904 (e.g., the reinforcement learning sub-engine in the storage management engine 304 in the storage management device 206/300 selecting to "do nothing" action a[n] in response to the state s[n] and previous reward r[n−1] in the example above), the storage management engine 304 in the storage management device 206/300 may again determine the (subsequent) shared storage space state of the shared storage space 500.

If at decision block 904, it is determined that the shared storage space state qualifies for a shared storage space reclamation action, the method 900 proceeds to block 906 where the storage management device identifies data that 1) is stored in the shared storage space in excess of user storage quota(s), 2) has been accessed below a data access threshold, and 3) has been stored for longer than its retention time period. In an embodiment, at block 906 and in response to determining that the shared storage space 500 qualifies for the shared space reclamation action at decision block 904 (e.g., the reinforcement learning sub-engine in the storage management engine 304 in the storage management device 206/300 selecting to "reclaim storage capacity" action a[n] in response to the state s[n] and previous reward r[n−1] in the example above), the storage management engine 304 in the storage management device 206/300 may identify data in the shared storage space 500 that exceeds user storage quota(s), has been accessed below a data access threshold, and has been stored for longer than its retention time period.

Figure 10:
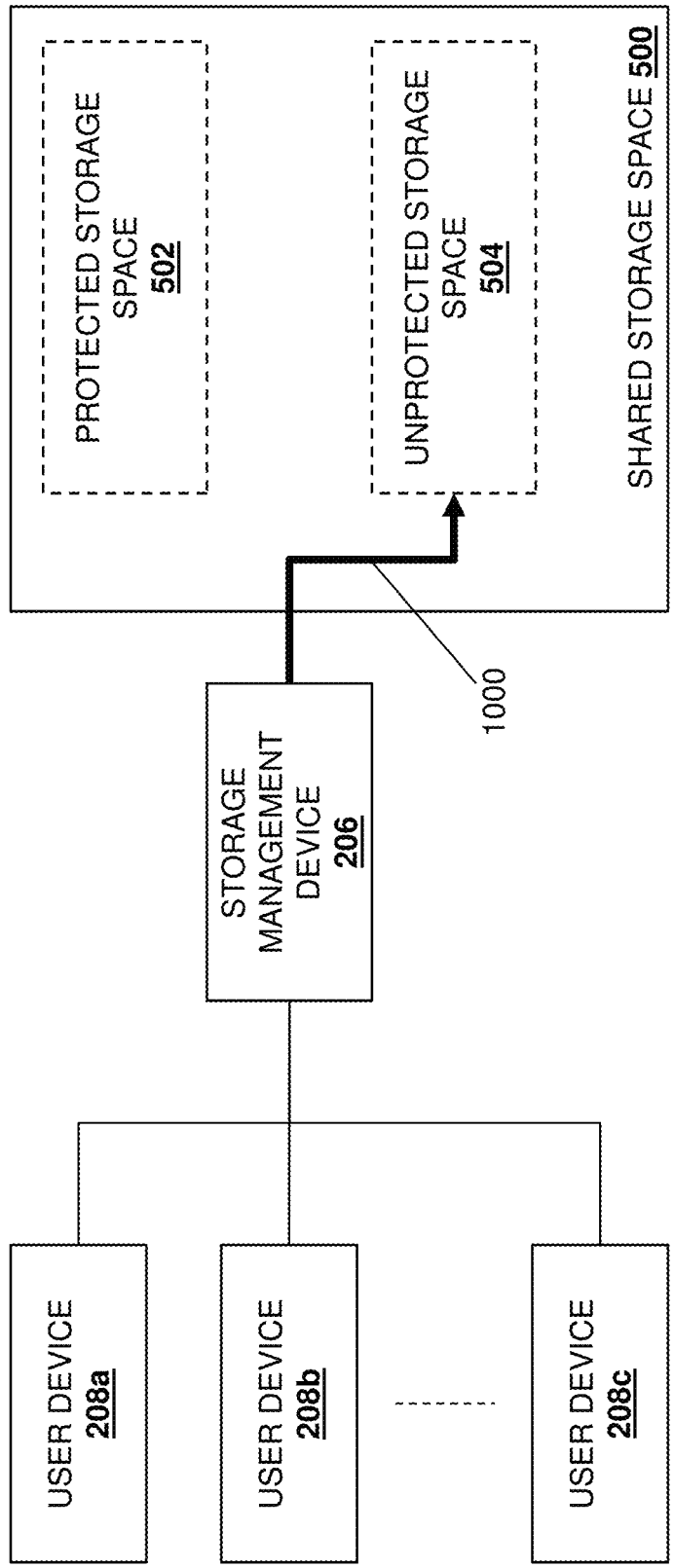
FIG. 10 is a schematic view illustrating an embodiment of the networked system of FIG. 5 operating during the method of FIG. 9.

For example, at block 906, the storage management engine 304 in the storage management device 206/300 may, for each user of the shared storage space, identify data that was stored for that user in the unprotected storage space 504 included in the shared storage space 500, that exceeds the user storage quota for that user, and that has been stored in the unprotected storage space 504 included in the shared storage space 500 for longer than the retention time period for that data. The method 900 then proceeds to block 908 where the storage management device deletes that data from the shared storage space. With reference to FIG. 10, in an embodiment of block 908 and for any data identified as having been stored for a user in the unprotected storage space 504 included in the shared storage space 500, exceeding the user storage quota for that user, and having been stored in the unprotected storage space 504 included in the shared storage space 500 for longer than the retention time period for that data, the storage management engine 304 in the storage management device 206/300 may perform data deletion operations 1000 that include deleting that data from the unprotected storage space 504 included in the shared storage space 500.

For example, at blocks 906 and 908 the storage management engine 304 in the storage management device 206/300 may identify the user that stored data in excess of their user storage quota according to the method 400 discussed above, scan the shared storage space usage by that user to determine if the amount of the protected data space 502 and the unprotected data space 504 included in the shared storage space 500 utilized by that user to store their data is in excess of their user storage quota, and then operate to delete any of that data that has been stored in the unprotected data space 504 included in the shared storage space 500 for longer than its retention time period based on a Least Recently Used (LRU) policy until the amount of the protected data space 502 and the unprotected data space 504 included in the shared storage space 500 utilized by that user to store their data is no longer in excess of their user storage quota, or else that user has no more data to delete. The storage management engine 304 in the storage management device 206/300 may then do the same for each other user of the shared storage space 500. Thus, users will only have their data automatically deleted from the unprotected storage space 504 included in the shared storage space 500 until the total amount of data they have stored in the shared storage space 500 is below their user storage quota.

Figure 11:
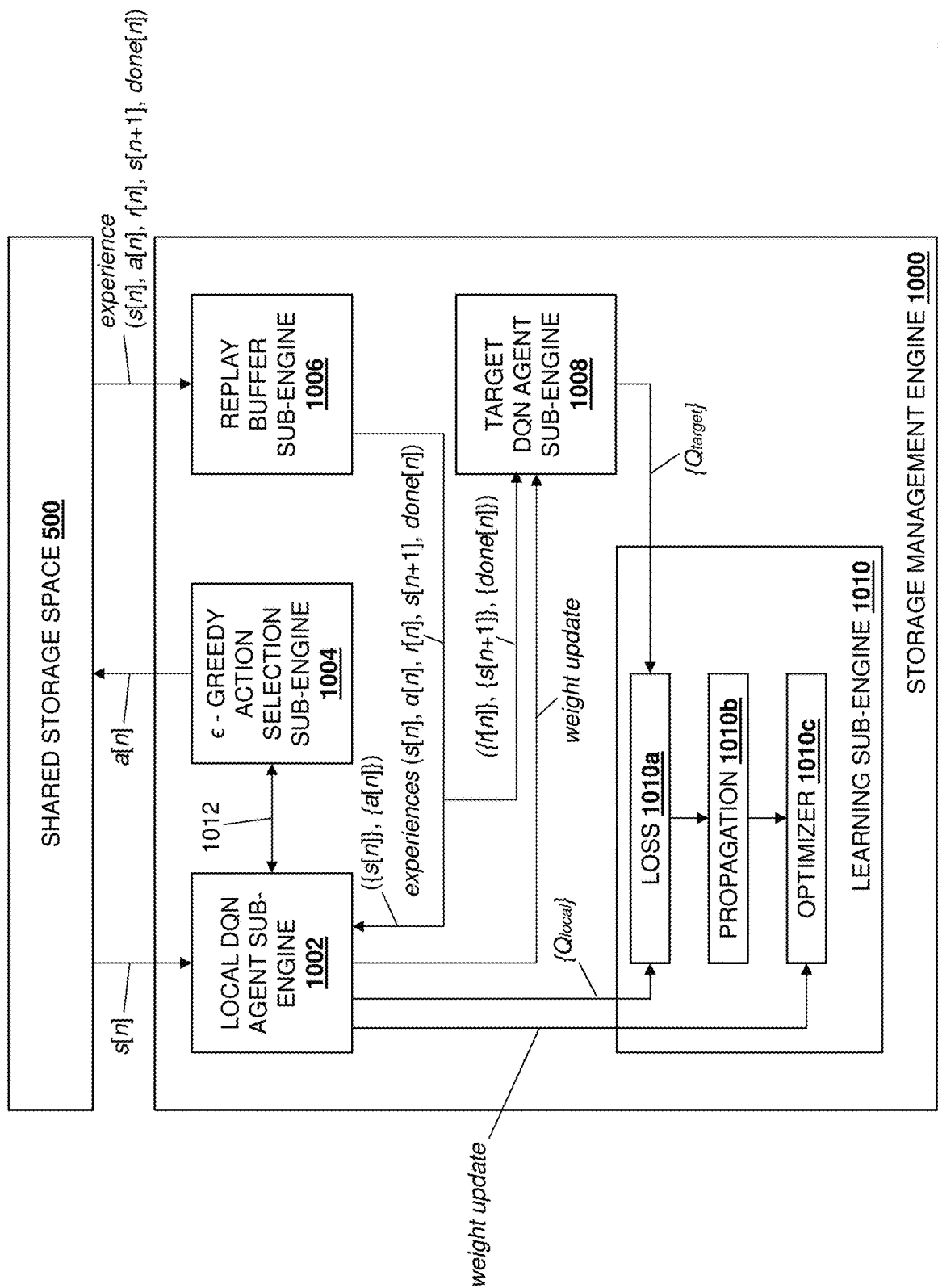
FIG. 11 is a schematic view illustrating an embodiment of the storage management device of FIG. 3 operating during the method of FIG. 9.

With reference to FIG. 11, an embodiment of a storage management engine 1000 that may be provide the storage management engine 304 in the storage management device 206/300 discussed above is illustrated that includes the reinforcement sub-engine discussed above. In the specific example below, Deep Q-Network (DQN) reinforcement learning techniques are utilized, which one of skill in the art in possession of the present disclosure will recognize combine Q learning and deep neural networks to solve relatively complex problems in which the state space is continuous, and operate to identify dynamics in environments and learn during runtime. As such, in the illustrated example, the storage management engine 1000 includes a local Deep Q-Network (DQN) agent sub-engine 1002 that is coupled to the shared storage space 500, an ϵ-greedy action selection sub-engine 1004 that is coupled to the local DQN agent sub-engine 1002 and the shared storage space 500, a replay buffer sub-engine 1006 that is coupled to the ϵ-greedy action selection sub-engine 1004 and the shared storage space 500, a target DQN agent sub-engine 1008 that is coupled to the local DQN agent sub-engine 1002 and the replay buffer sub-engine 1006, and a learning sub-engine 1010 that is coupled to the local DQN agent sub-engine 1002 and the target DQN agent sub-engine 1008. Furthermore, the learning sub-engine 1010 includes a loss component 1010a that is coupled to the local DQN agent sub-engine 1002 and the target DQN agent sub-engine 1008, a propagation component 1010b that is coupled to the loss component 1010a, and an optimizer component 1010c that is coupled to the propagation component 1010b and the local DQN agent sub-engine 1002.

As illustrated, the local DQN agent sub-engine 1002 may identify the state s[n] of the shared storage space 500, and may perform action selection operations 1012 with the ϵ-greedy action selection sub-engine 1004 to select an action a[n] to perform on the shared storage space 500 (e.g., "reclaim storage capacity" or "do nothing" in the examples above). As discussed above, the use of ϵ-greedy action selection techniques in the selection of actions a[n] provides for the exploration of new opportunities rather than always selecting the best action a[n] determined by the local DQN agent sub-engine 1002. As discussed above, in response to performing the action a[n], a reward r[n] will be provided and the local DQN agent sub-engine may move to the subsequent state s[n+1], while the replay buffer sub-engine 1006 may operate to save the current experience (s[n], a[n], r[n], s[n+1], done[n]). Furthermore, every N STEP iterations, a batch of experiences (s[n], a[n], r[n], s[n+1], done[n]) may be provided from the replay buffer sub-engine 1006 to the target DQN agent sub-engine 1008 ({s[n]}, {a[n]},) and the local DQN agent sub-engine 1002 ({r[n]}, {s[n+1]}, {done[n]}). Target Q values ($Q_{target}$) may then be determined by the learning sub-engine 1010 from the outputs of the target DQN sub-engine 1008 and using the following equation (where γ is the discount factor):

$$Q_{target}(s[k],a[k])=r[k]+\gamma \cdot \max_a\{Q_{target}(s[k+1],a)\}$$

Similarly, expected Q values ({$Q_{local}$(s[k], a[k])}) may be determined by the learning sub-engine 1010 from the outputs of the local DQN sub-engine 1002, and the loss component 1010a in the learning sub-engine 1010 may calculate the Mean Squared Error (MSE) between the target Q values ($Q_{target}$) and the expected Q values. The propagation component 1010b in the learning sub-engine 1010 may then backward propagate the MSE (calculated by the loss component 1010a) within the local DQN agent sub-engine 1002, and the optimizer component 1010c in the learning sub-engine 1010 may update the weights of the local DQN agent sub-engine 1002, with the weights of the target DQN agent sub-engine 1008 updated according to the following equation:

$$\theta_{target}=\tau \cdot \theta_{local}+(1-\tau) \cdot \theta_{target}$$

where $\theta_{target}$ represents the weight of the target DQN agent sub-engine 1008, $\theta_{local}$ represents the weight of the local DQN agent sub-engine 1002, and T is a hyper-parameter providing the update rate (which is typically relatively small). As such, instead of updating the target DQN agent sub-engine 1008 at one time, a "soft update" technique may be utilized to move the target DQN agent sub-engine 1008 slightly to the local DQN agent sub-engine 1002 frequently.

Figure 12:
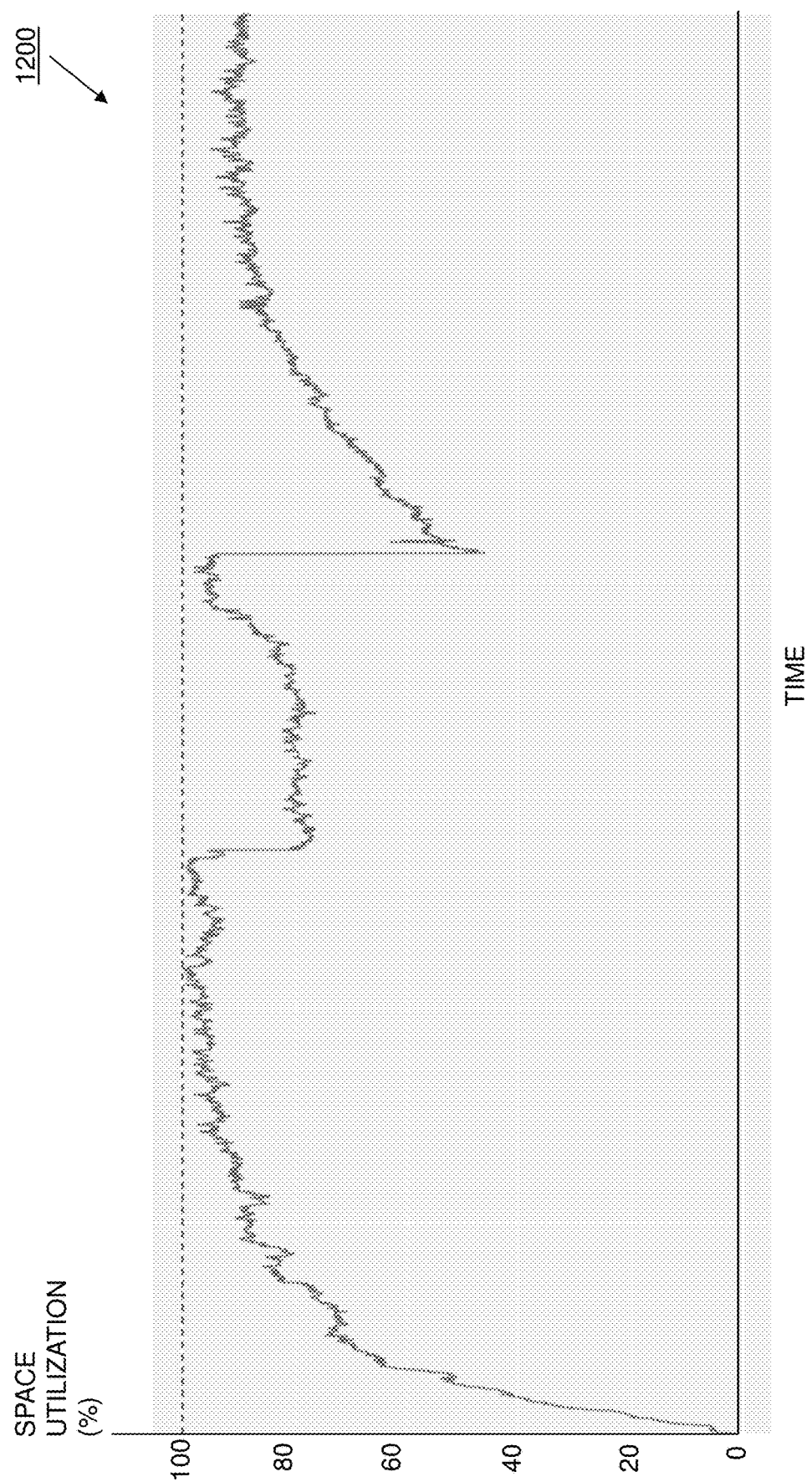
FIG. 12 is a graph view illustrating an experimental embodiment of the operation of the shared storage dynamic user quota system of the present disclosure.
Figure 13:
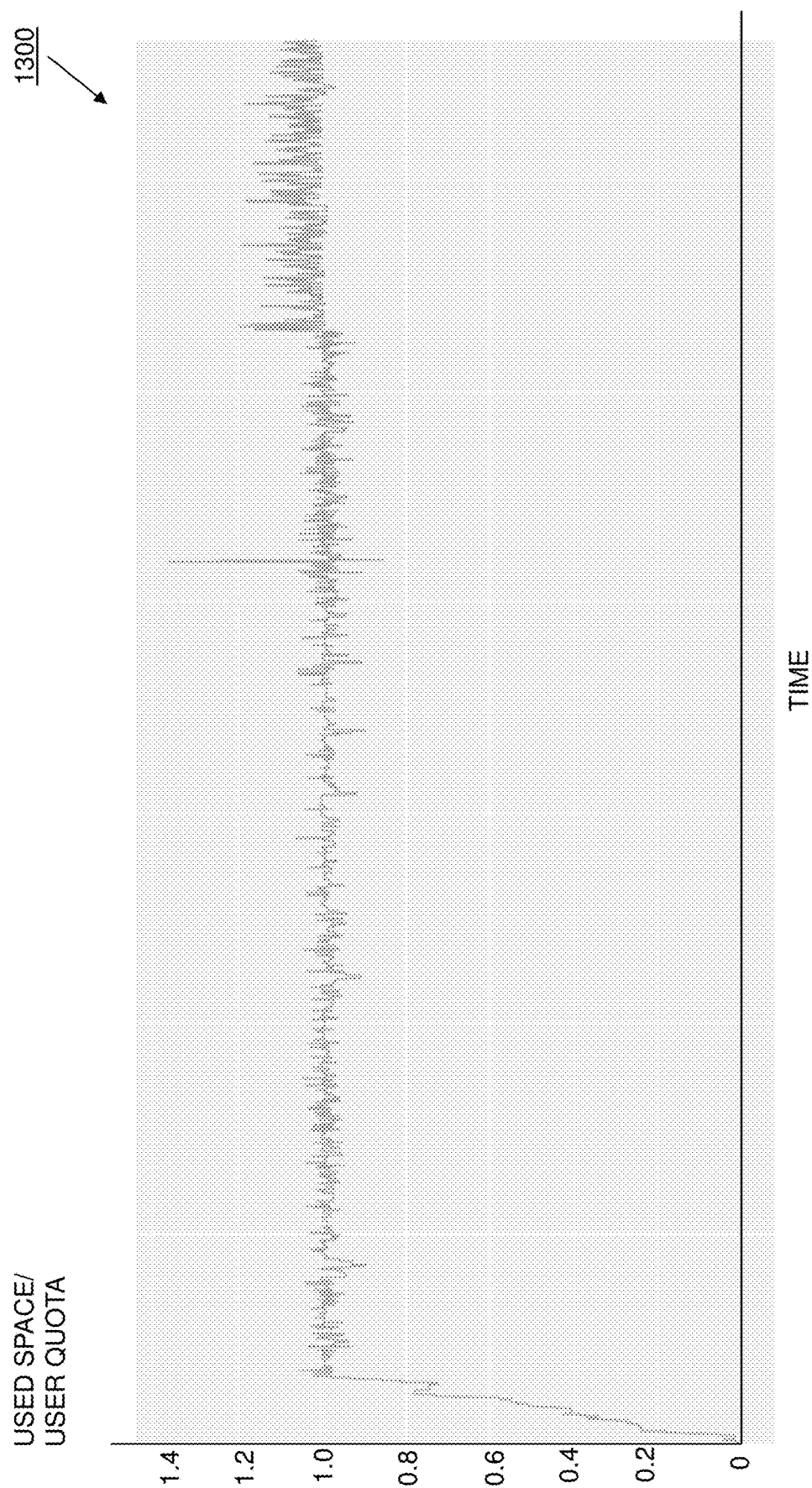
FIG. 13 is a graph view illustrating an experimental embodiment of the operation of the shared storage dynamic user quota system of the present disclosure.

With reference to FIG. 12, an experimental embodiment of the shared storage dynamic user quota system of the present disclosure included 10 users utilized a shared storage space having a total capacity of 20 GB, and resulted in a graph 1200 that plots space utilization of the shared storage space by all of the users over time. As discussed above, the shared storage dynamic user quota system of the present disclosure allowed the users to exceed their user storage quotas temporarily to meet their storage demands for relatively short periods of time, increasing the utilization and efficiency of the shared storage system, particularly when other users were using less of the shared storage system than allowed by the user storage quotas. As can be seen in FIG. 12, the experimental embodiment of the shared storage dynamic user quota system was able to reclaim storage capacity allocated to the users automatically and without human/manual intervention, allowing the space utilization of the shared storage system to regularly approach (while not reaching) the total capacity of the shared storage system, thus providing a shared storage system that is more efficient and flexible than conventional shared storage systems, and benefitting both the user and storage administrators.

With reference to FIG. 12, the experimental embodiment of the shared storage dynamic user quota system of the present disclosure also resulted in a graph 1300 that plots space utilization of the shared storage space by a particular user over time. As will be appreciated by one of skill in the art in possession of the present disclosure, the user from which the graph 1300 was generated provided a relatively large storage demand over time, with the shared storage space utilized by that user fluctuating and exceeding the user storage quota for that user regularly (e.g., values exceeding 1.0 in the graph 1300), but only for short periods of time. As such, the experimental embodiment of the shared storage dynamic user quota system of the present disclosure was able to prevent users with relatively high storage demands from using up more than a threshold amount of the free storage resources, while still allowing those users to exceed their user storage quotas.

Thus, systems and methods have been described that provide for the storage of data in shared storage space provided by a shared storage system in a manner that provides dynamic/elastic user storage quotas that allow some users to utilize more of the shared storage space than is allowed per their user storage quota for limited time periods. For example, the shared storage dynamic user quota system of the present disclosure may include a storage management device coupled to a storage system having a shared storage space. The storage management device receives a data storage request from a user device to store data in the shared storage space. If the storage management device determines that the storage of the data in the shared storage space will exceed a user storage quota for a user associated with the user device, it determines whether the user qualifies to store the data in the shared storage space and exceed the user storage quota. In response to determining that the user qualifies to store the data in the shared storage space and exceed the user storage quota, the storage management device stored the data in the shared storage space. As such, users of the shared storage system with relatively short-term, high storage demands may exceed their user storage quotas, which provides a more efficient utilization of the shared storage space, particularly when other users of the shared storage system are utilizing less of the shared storage space than is allowed per their user storage quota.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A shared storage dynamic user quota system, comprising:
   a storage system including a shared storage space; and
   a storage management device that is coupled to the storage system and that is configured to:
   receive, from a user device, a data storage request to store data in the shared storage space;
   determine that the storage of the data in the shared storage space will exceed a user storage quota for a user associated with the user device;
   determine, in response to determining that the storage of the data in the shared storage space will exceed the user storage quota, that the user qualifies to store the data in the shared storage space and exceed the user storage quota based on an amount of the shared storage space required to store the data in excess of the user storage quota being less that a maximum portion of the shared storage space that is allowed for storage of data by the user in excess of the user storage quota and that includes a proportional share for the user, relative to a plurality of other users, of the currently remaining free/unused storage capacity of the shared storage space; and
   store, in response to determining that the user qualifies to store the data in the shared storage space and exceed the user storage quota, the data in the shared storage space.

2. The system of claim 1, wherein the storage management device is further configured to:
   determine that a shared storage space state of the shared storage space qualifies for a shared storage space reclamation action; and
   perform the shared storage space reclamation action, wherein the shared storage space reclamation action includes:
   determining that the data that is stored in the shared storage space and that exceeds the user storage quota has been accessed below a data access threshold and has been stored in the shared storage space for longer than a retention time period; and
   deleting, in response to the data that is stored in the shared storage space and that exceeds the user storage quota having been accessed below the data access threshold and having been stored in the shared storage space for longer than the retention time period, the data from the shared storage space.

3. The system of claim 2, wherein storage management device includes a reinforcement learning engine that is configured to determine that the shared storage space state of the shared storage space qualifies for the shared storage space reclamation action.

4. The system of claim 3, wherein the reinforcement learning engine included in the storage management device is configured, in response to performing the shared storage space reclamation action, to receive a shared storage space reclamation action reward that is configured to cause the reinforcement learning engine to perform the shared storage space reclamation action relatively more often when the share storage space stores relatively more data, and relatively less often when the share storage space stores relatively less data.

5. The system of claim 1, wherein the proportional share for the user, relative to the plurality of other users, of the currently remaining free/unused storage capacity of the shared storage space is provided by a ratio of the user to the plurality of other users.

6. The system of claim 1, wherein the shared storage space includes a protected storage space and an unprotected storage space, and wherein the data is stored in the unprotected storage space included in the shared storage space.

7. An Information Handling System (IHS), comprising:
   a processing system; and
   a memory system that is coupled to the processing system and that includes instructions that, when executed by the processing system, cause the processing system to provide a storage management engine that is configured to:
   receive, from a user device, a data storage request to store data in a shared storage space;
   determine that the storage of the data in the shared storage space will exceed a user storage quota for a user associated with the user device;
   determine, in response to determining that the storage of the data in the shared storage space will exceed the user storage quota, that the user qualifies to store the data in the shared storage space and exceed the user storage quota based on an amount of the shared storage space required to store the data in excess of the user storage quota being less that a maximum portion of the shared storage space that is allowed for storage of data by the user in excess of the user storage quota and that includes a proportional share for the user, relative to a plurality of other users, of the currently remaining free/unused storage capacity of the shared storage space; and store, in response to determining that the user qualifies to store the data in the shared storage space and exceed the user storage quota, the data in the shared storage space.

8. The IHS of claim 7, wherein the storage management engine is configured to:

determine that a shared storage space state of the shared storage space qualifies for a shared storage space reclamation action; and perform the shared storage space reclamation action, wherein the shared storage space reclamation action includes:

determining that the data that is stored in the shared storage space and that exceeds the user storage quota has been accessed below a data access threshold and has been stored in the shared storage space for longer than a retention time period; and deleting, in response to the data that is stored in the shared storage space and that exceeds the user storage quota having been accessed below the data access threshold and having been stored in the shared storage space for longer than the retention time period, the data from the shared storage space.

9. The IHS of claim 8, wherein storage management engine includes a reinforcement learning sub-engine that is configured to determine that the shared storage space state of the shared storage space qualifies for the shared storage space reclamation action.

10. The IHS of claim 9, wherein the reinforcement learning sub-engine included in the storage management device is configured, in response to performing the shared storage space reclamation action, to receive a shared storage space reclamation action reward.

11. The IHS of claim 10, wherein the shared storage space reclamation action reward is configured to cause the reinforcement learning sub-engine to perform the shared storage space reclamation action relatively more often when the share storage space stores relatively more data, and relatively less often when the share storage space stores relatively less data.

12. The IHS of claim 7, wherein the proportional share for the user, relative to the plurality of other users, of the currently remaining free/unused storage capacity of the shared storage space is provided by a ratio of the user to the plurality of other users.

13. The IHS of claim 7, wherein the shared storage space includes a protected storage space and an unprotected storage space, and wherein the data is stored in the unprotected storage space included in the shared storage space.

14. A method for provided dynamic user quotas in a shared storage system, comprising:

receiving, by a storage management device from a user device, a data storage request to store data in a shared storage space;

determining, by the storage management device, that the storage of the data in the shared storage space will exceed a user storage quota for a user associated with the user device;

determining, by the storage management device in response to determining that the storage of the data in the shared storage space will exceed the user storage quota, that the user qualifies to store the data in the shared storage space and exceed the user storage quota based on an amount of the shared storage space required to store the data in excess of the user storage quota being less that a maximum portion of the shared storage space that is allowed for storage of data by the user in excess of the user storage quota and that includes a proportional share for the user, relative to a plurality of other users, of the currently remaining free/unused storage capacity of the shared storage space; and storing, by the storage management device in response to determining that the user qualifies to store the data in the shared storage space and exceed the user storage quota, the data in the shared storage space.

15. The method of claim 14, further comprising:

determining, by the storage management device, that a shared storage space state of the shared storage space qualifies for a shared storage space reclamation action; and performing, by the storage management device, the shared storage space reclamation action, wherein the shared storage space reclamation action includes:

determining, by the storage management device, that the data that is stored in the shared storage space and that exceeds the user storage quota has been accessed below a data access threshold and has been stored in the shared storage space for longer than a retention time period; and deleting, by the storage management device in response to the data that is stored in the shared storage space and that exceeds the user storage quota having been accessed below the data access threshold and having been stored in the shared storage space for longer than the retention time period, the data from the shared storage space.

16. The method of claim 15, wherein storage management device includes a reinforcement learning sub-engine that is configured to determine that the shared storage space state of the shared storage space qualifies for the shared storage space reclamation action.

17. The method of claim 16, wherein the reinforcement learning sub-engine included in the storage management device is configured, in response to performing the shared storage space reclamation action, to receive a shared storage space reclamation action reward.

18. The method of claim 17, wherein the shared storage space reclamation action reward is configured to cause the reinforcement learning sub-engine to perform the shared storage space reclamation action relatively more often when the share storage space stores relatively more data, and relatively less often when the share storage space stores relatively less data.

19. The method of claim 14, wherein the proportional share for the user, relative to the plurality of other users, of the currently remaining free/unused storage capacity of the shared storage space is provided by a ratio of the user to the plurality of other users.

20. The method of claim 14, wherein the shared storage space includes a protected storage space and an unprotected storage space, and wherein the data is stored in the unprotected storage space included in the shared storage space.

* * * * *